(12) United States Patent
Tinucci

(10) Patent No.: US 7,369,740 B2
(45) Date of Patent: May 6, 2008

(54) CABLE MANAGEMENT SYSTEM WITH SPRING LATCH

(75) Inventor: Thomas C. Tinucci, Eden Prairie, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 11/510,526

(22) Filed: Aug. 25, 2006

(65) Prior Publication Data

US 2008/0050085 A1 Feb. 28, 2008

(51) Int. Cl.
*G02B 6/00* (2006.01)
(52) U.S. Cl. ........................ 385/135; 385/134
(58) Field of Classification Search ............... 385/134, 385/135
See application file for complete search history.

(56) References Cited

U.S. PATENT DOCUMENTS

| | | |
|---|---|---|
| 693,127 A | 2/1902 | Garnder et al. |
| 1,751,463 A | 3/1930 | Clayton |
| 2,913,210 A | 11/1959 | Tichnor |
| 3,159,368 A | 12/1964 | Bhibin |
| 3,204,776 A | 9/1965 | Brown et al. |
| 3,315,816 A | 4/1967 | Mallory |
| 3,388,806 A | 6/1968 | Cunningham, Jr. et al. |
| 3,420,482 A | 1/1969 | Taylor |
| 3,512,653 A | 5/1970 | Erismann |
| 3,516,552 A | 6/1970 | Salava |
| 3,986,318 A | 10/1976 | McConnell |
| 4,303,217 A | 12/1981 | Garfinkle |
| 4,405,108 A | 9/1983 | Muirhead |
| 4,441,619 A | 4/1984 | Gibitz |
| 4,527,760 A | 7/1985 | Salacuse |
| 4,619,428 A | 10/1986 | Bailey |
| 4,681,233 A | 7/1987 | Roth |
| 4,768,660 A | 9/1988 | Handler et al. |
| 5,143,331 A | 9/1992 | Robert |
| 5,163,567 A | 11/1992 | Betts |
| 5,165,640 A | 11/1992 | Williams, III |
| 5,379,976 A | 1/1995 | DeGirolamo |
| 5,420,762 A | 5/1995 | Lewis |
| 5,588,631 A | 12/1996 | Yee |
| 5,640,482 A | 6/1997 | Barry et al. |

(Continued)

FOREIGN PATENT DOCUMENTS

EP   1 160 605 A2   5/2001

(Continued)

OTHER PUBLICATIONS

Exhibit A, "Next Generation Frame (NGF) Product Family Ordering Guide," *ADC Telecommunications, Inc.*, 2 pages, Copyright 1998.

(Continued)

*Primary Examiner*—Brian Healy
*Assistant Examiner*—Derek L. Dupuis
(74) *Attorney, Agent, or Firm*—Merchant & Gould P.C.

(57) ABSTRACT

A cable management assembly, and methods related thereto, including a panel having a plurality of discrete openings, including first shaped apertures and second shaped apertures. The assembly further including cable management devices having low-profile mounting arrangements. The low-profile mounting arrangements being configured to mount the cable management devices at selected locations on the panel.

53 Claims, 7 Drawing Sheets

U.S. PATENT DOCUMENTS

| | | | |
|---|---|---|---|
| 5,653,349 A | 8/1997 | Dana et al. |
| 5,738,020 A | 4/1998 | Correia |
| 5,758,002 A | 5/1998 | Walters |
| 5,778,130 A | 7/1998 | Walters et al. |
| 5,785,190 A | 7/1998 | Otema |
| 5,791,502 A | 8/1998 | Bietz et al. |
| 5,930,972 A | 8/1999 | Benner et al. |
| 6,003,685 A | 12/1999 | Malin |
| 6,115,977 A | 9/2000 | Hornberger et al. |
| 6,123,400 A | 9/2000 | Nicolai et al. |
| 6,129,316 A | 10/2000 | Baur |
| 6,131,347 A | 10/2000 | Hornberger et al. |
| 6,170,673 B1 | 1/2001 | Nicolai |
| 6,189,847 B1 | 2/2001 | Hart |
| 6,193,198 B1 | 2/2001 | Baur et al. |
| 6,238,028 B1 | 5/2001 | Benner et al. |
| 6,266,250 B1 | 7/2001 | Foye |
| 6,267,254 B1 | 7/2001 | Chen |
| 6,270,281 B1 | 8/2001 | Ruusuvvuori |
| 6,282,854 B1 | 9/2001 | Vos et al. |
| 6,289,618 B1 | 9/2001 | Kump et al. |
| 6,352,164 B1 | 3/2002 | Hyattte et al. |
| 6,363,198 B1 | 3/2002 | Braga et al. |
| 6,397,533 B1 | 6/2002 | Hornberger et al. |
| 6,398,149 B1 | 6/2002 | Hines et al. |
| 6,405,984 B1 | 6/2002 | Simons et al. |
| 6,423,898 B1 | 7/2002 | Croker |
| 6,443,320 B1 | 9/2002 | Herzog et al. |
| 6,481,583 B1 | 11/2002 | Black et al. |
| D467,793 S | 12/2002 | Zadak |
| D469,003 S | 1/2003 | Valiulis |
| 6,516,955 B1 | 2/2003 | Dudhwala et al. |
| 6,581,788 B1 | 6/2003 | Winig et al. |
| 6,595,379 B1 | 7/2003 | Powell |
| 6,684,583 B2 | 2/2004 | Hodges et al. |
| 7,070,021 B1 | 7/2006 | McKinney |
| 7,083,051 B2 | 8/2006 | Smith et al. |
| 7,219,808 B2 | 5/2007 | Wright et al. |
| 2004/0094491 A1 | 5/2004 | Smith et al. |
| 2006/0228087 A1* | 10/2006 | Bayazit et al. ............. 385/135 |
| 2007/0189693 A1* | 8/2007 | Smrha et al. ............... 385/135 |

FOREIGN PATENT DOCUMENTS

| | | |
|---|---|---|
| FR | 2 701 345 A1 | 8/1994 |
| WO | WO 01/01534 A1 | 1/2001 |
| WO | WO 02/052866 A2 | 7/2002 |

OTHER PUBLICATIONS

Exhibit B, "Fiber Panel Products, Second Edition," *ADC Telecommunications, Inc.*, 3 pages, Copyright 1994, 1996.

Exhibit C, "Fiber Cable Management Products, Third Edition," *ADC Telecommunications, Inc.*, 8 pages, Copyright 1995, 1998.

Exhibit D, "Value-Added Module System," *ADC Telecommunications, Inc.*, 2 pages, Copyright 1993, 1994, 1998.

* cited by examiner

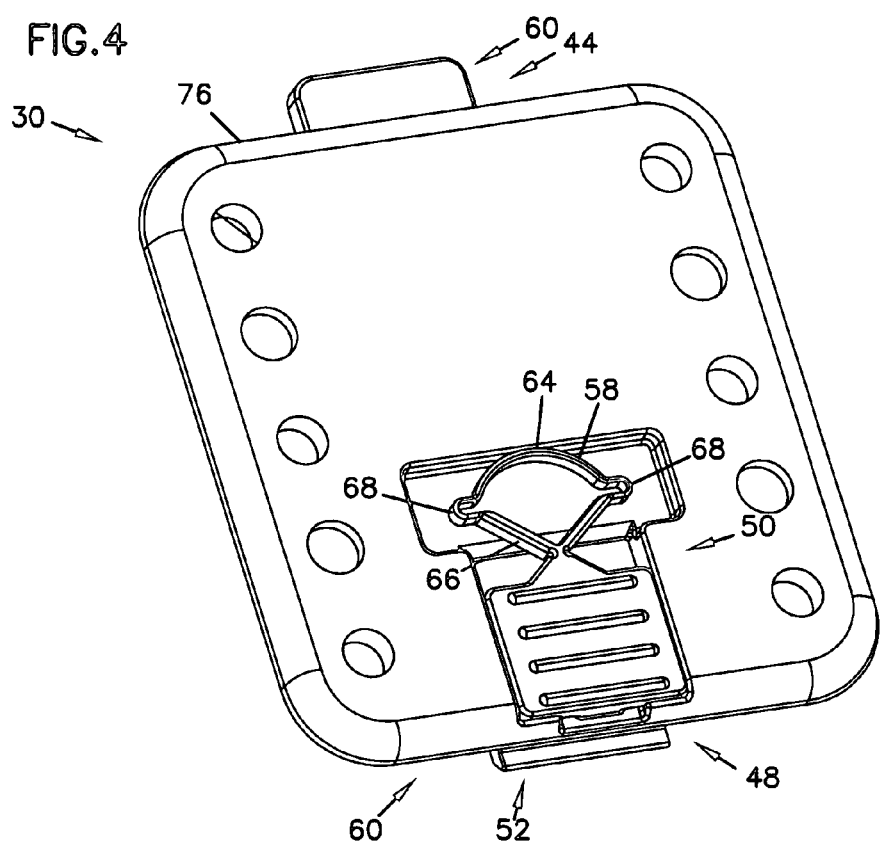
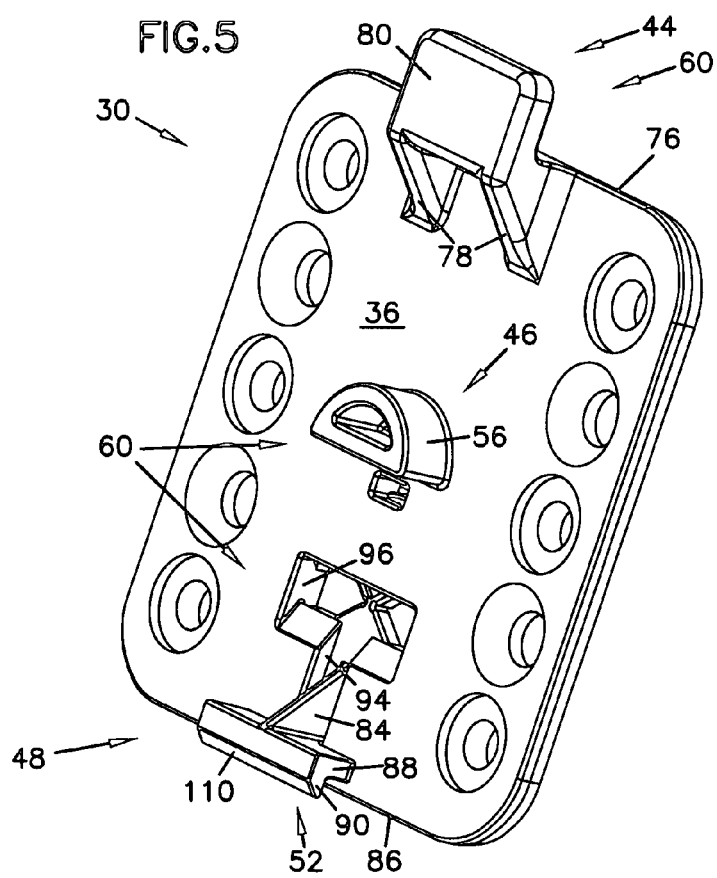

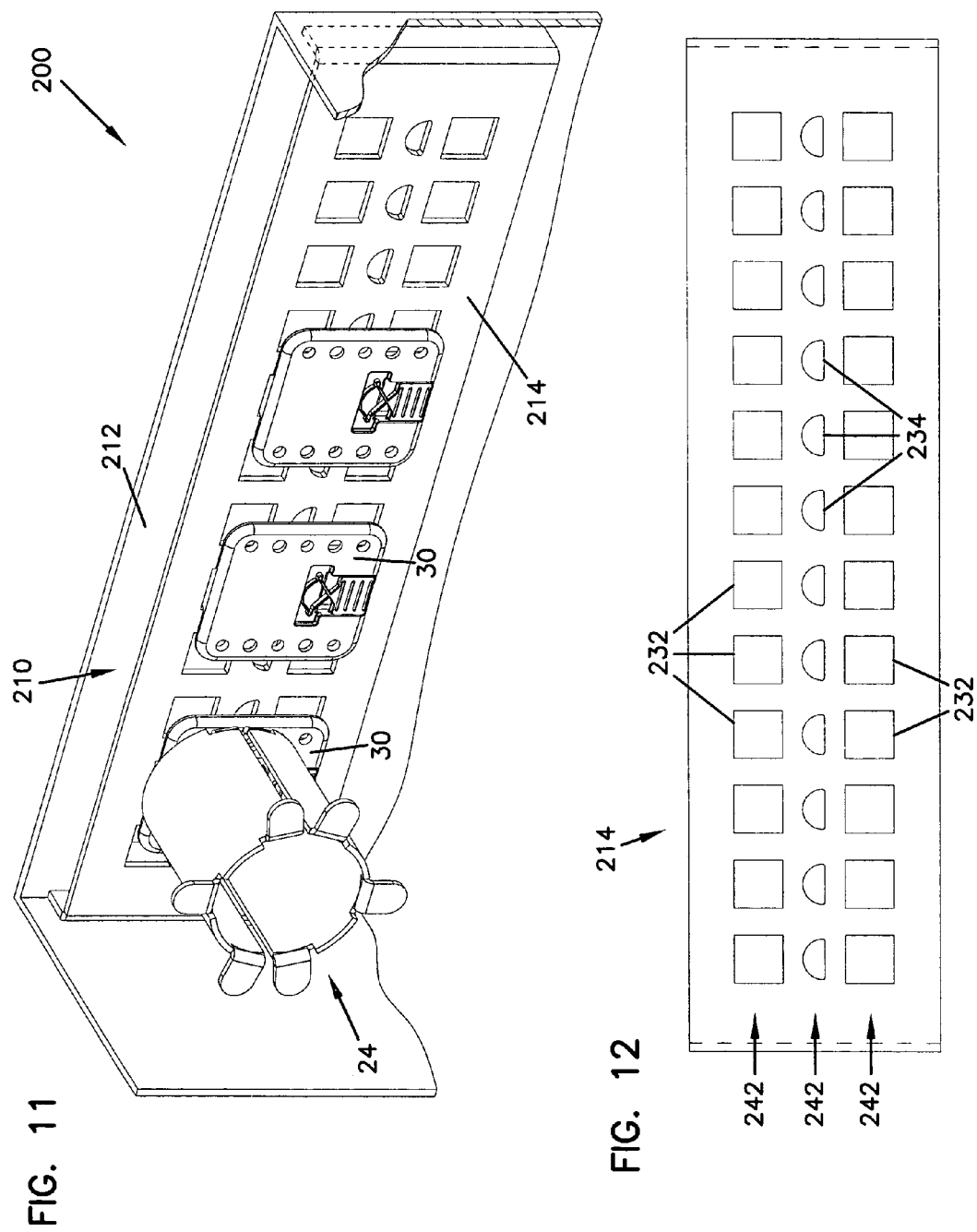

CABLE MANAGEMENT SYSTEM WITH SPRING LATCH

TECHNICAL FIELD

The present invention relates generally to devices and methods for enhancing cable management of telecommunications systems. More particularly, the present invention relates to a cable management panel and devices for managing cables of telecommunications systems.

BACKGROUND

Telecommunications systems utilize cables, such as fiber optic cables and copper twisted pair cables, for interconnecting pieces of telecommunications equipment or components. The systems commonly include telecommunication racks that hold a variety of different pieces of telecommunications equipment. Often thousands of cables are used to interconnect the various pieces of telecommunications equipment mounted on the racks.

Because of the large number of cables associated with telecommunications equipment, cable management is crucial. Cable management involves efficiently routing cables to minimize the occupied space, and routing cables in an orderly manner so as to reduce the likelihood of cable tangling. Ease of cable organization is also a factor related to effective cable management.

In general, conventional arrangements for managing cables can be improved.

SUMMARY

The present disclosure relates to a cable management assembly including a panel to which cable management devices can be selectively mounted. One aspect of the assembly concerns a low-profile back plate of the cable management devices. The low-profile back plate is sized to provide greater versatility for use in applications where space is limited. Another aspect of the assembly concerns the panel. The panel includes a plurality of discrete openings including first shaped apertures and second shaped apertures. Yet another aspect of the assembly concerns the combination of the devices and the panel wherein the combination provides a cable management assembly that is easy to use.

A variety of aspects of the invention are set forth in part in the description that follows, and in part will be apparent from the description, or may be learned by practicing various aspects of the disclosure. The aspects of the disclosure may relate to individual features as well as combinations of features. It is to be understood that both the foregoing general description and the following detailed description are exemplary and explanatory only, and are not restrictive of the claimed invention.

BRIEF DESCRIPTION OF THE DRAWINGS

FIG. 4 is a front perspective view of a back plate of a device of the cable management assembly of FIG. 1, shown in isolation;

FIG. 5 is a rear perspective view of the back plate of FIG. 4;

FIG. 11 is a front perspective view of another embodiment of a cable management system, partially shown, and including another cable management assembly in accordance with the principles disclosed; and FIG. 12 is a front elevation view of a panel of the cable management assembly of FIG. 11, shown in isolation.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Figure 1:
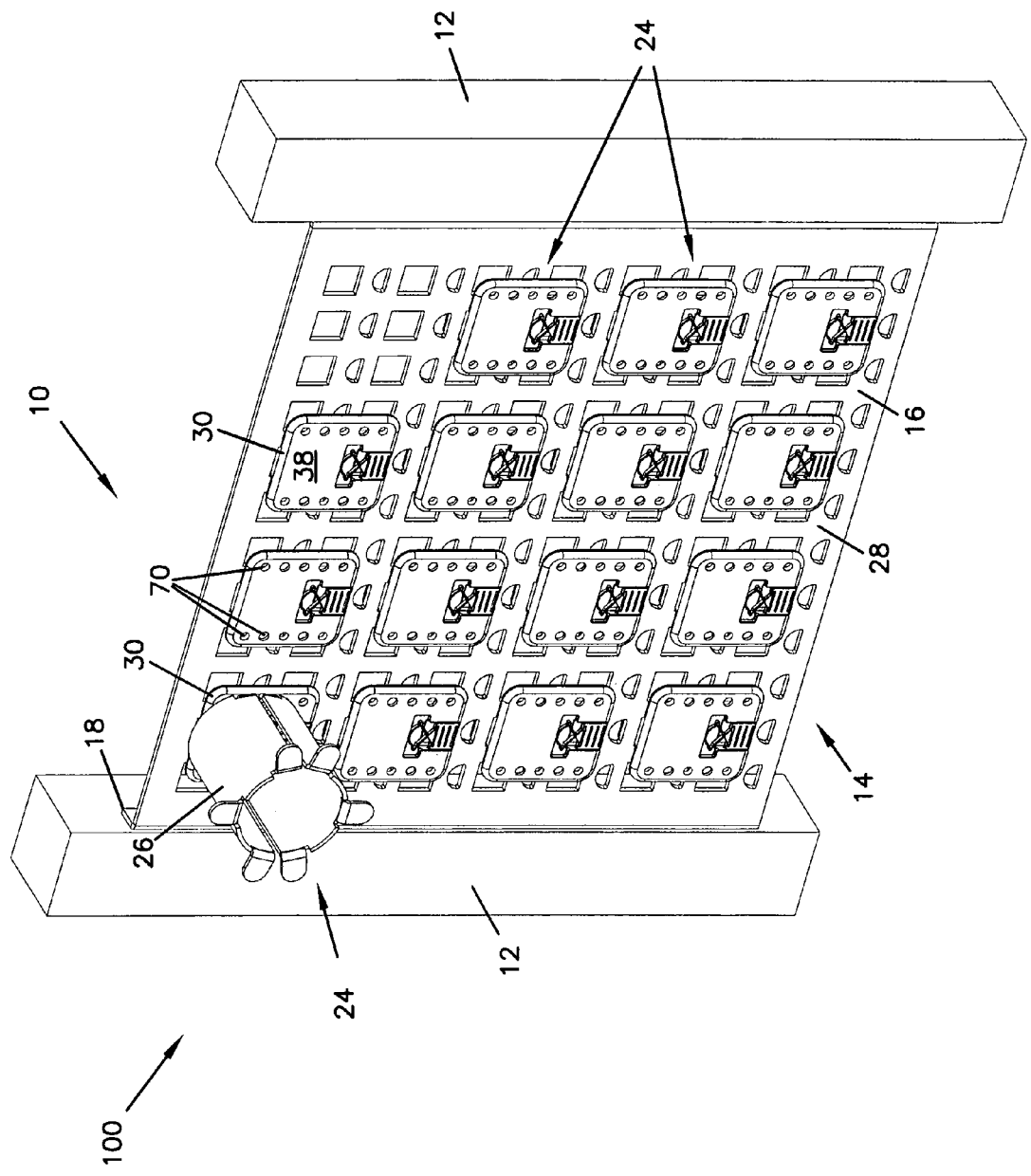
FIG. 1 is a front perspective view of one embodiment of a cable management system, partially shown, and including a cable management assembly in accordance with the principles disclosed.

Referring to FIG. 1, a telecommunications system 100 for managing cables interconnected to telecommunications components is illustrated. The telecommunications system 100 includes a cable management assembly 10 mounted between adjacent first and second telecommunication racks 12 (schematically and only partially represented). The telecommunication racks 12 can be configured to receive a variety of telecommunications components. For example, the racks 12 can hold fiber termination panels (not shown) having fiber optic adapters. Similar telecommunication racks 12 to which the present cable management assembly 10 can be mounted are described in U.S. Patent Publication No. 20040094491, which application is incorporated herein by reference. In alternative embodiments, the cable management assembly 10 can be used with other telecommunication structures to manage cables. For example, the cable management assembly 10 can be mounted within a cabinet or within a termination panel enclosure.

The cable management assembly 10 includes a panel 14 (e.g., riser structure or back plane). The panel 14 includes an interface portion 16 and first and second mounting structures 18, 20 (see also FIG. 2) configured to mount or couple the cable management assembly 10 to the adjacent telecommunication racks 12. In one embodiment, the first and second mounting structures 18, 20 include flanges that extend generally perpendicular or outward from the interface portion 16 of the panel 14. In the illustrated embodiment, the first and second mounting flanges 18, 20 are located along the sides of the panel 14; although the flanges may also be located along the top and bottom of the panel as well. Fasteners, such as rivets or screws, are typically used to mount the panel 14 to the telecommunication racks 12.

Figure 2:
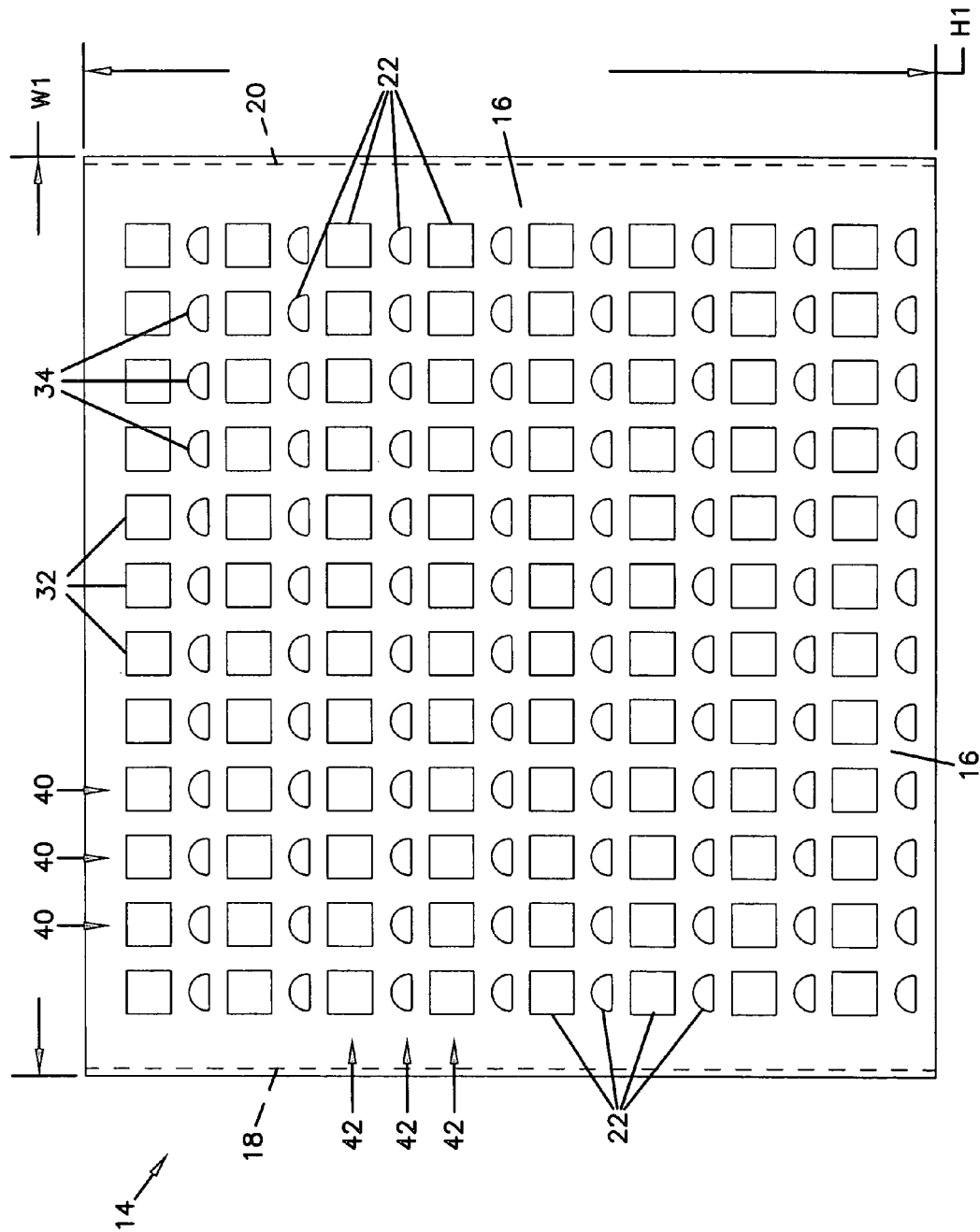
FIG. 2 is a front elevation view of a panel of the cable management assembly of FIG. 1, shown in isolation.

Referring to FIG. 2, the interface portion 16 of the panel 14 defines a plurality of discrete openings 22. Cable management devices 24 (FIG. 1) used to manage cables are secured to the panel 14 at the discrete openings 22. The discrete openings 22 are provided such that a user can organize and arrange the devices, and accordingly the cables, in a variety of configurations, as needed for the particular application.

With the present cable management assembly 10, a user has the flexibility to choose from a number of different cable management devices, each being configured to secure to the panel 14. FIG. 1 illustrates the panel 14 with one complete device 24 including a device body 26 and a back plate 30. For purposes of clarity, only one complete device with a device body 26 is shown. The other devices 24 are shown with only the back plate 30 to which an associated device body attaches.

The device bodies (e.g. 26) can include a number of cable managing structures. The illustrated device body of FIG. 1 includes a spool 26 that is attached to a front surface 38 of the back plate 30. Fastener holes 70 are provided in the back plate 30 of the device 24 to receive fasteners (not shown) for securing the various device bodies to the back plate. In the illustrated embodiment, the fastener holes 70 are vertically aligned along the sides of the back plate 30; although a variety of hole configurations or patterns can be used in association with the variety of device bodies. In addition, other ways of fastening or attaching the device body to the back plate can be employed.

The spool 26 of FIG. 1 can be used to hold excess cabling and includes a radius limiting surface or curved surface that prevents cables from exceeding a minimum bend radius. The spool is only one example of a cable management device body that can be attached to the back plate 30 and secured to the panel 14. Other cable management device bodies can include, for example, cable guides, tie-off brackets, edge protectors, channel guides, and radius limiters. Such device bodies are described in U.S. Patent Application No. 20040094491, previously incorporated herein by reference. Additional types of cable management devices or device bodies may include cable termination devices and flip-out trays. It is to be understood that the spool 26 is only one example of a number of cable management devices and device bodies that can be used with the presently disclosed cable management system 100.

Referring back to FIG. 2, the plurality of discrete openings 22 of the panel 14 is arranged to permit a user to position any of the different cable management devices 24 at a variety of locations on the panel 14 of the cable management assembly 10. In the illustrated embodiment, the plurality of discrete openings 22 includes a first type of shaped apertures 32 and a second type of shaped apertures 34. The first and second types of shaped apertures 32, 34 are configured to securely attach the cable management devices 24 to the interface portion 16 of the panel 14.

As shown in FIG. 2, the first and second shaped apertures 32, 34 of the discrete openings 22 are arranged on the panel 14 in an array of vertical columns 40 and horizontal rows 42. The columns and rows 40, 42 of the first and second shaped apertures 32, 34 define a repeating pattern that spans a majority of a width W1 of the panel. The repeating pattern also extends along a majority of a height H1 of the panel 14. The pattern preferably permits placement of the devices at various selected vertical and horizontal locations to provide a variety of cable management systems.

While the repeating pattern of the panel 14 includes a repeating pattern of vertical columns and/or horizontal rows, it will be appreciated that the arrangement of discrete openings of the illustrated embodiment of the present disclosure need not be limited to vertical and horizontal columns and rows. Rather, array arrangements oriented at various angular degrees from vertical and horizontal are within the scope of the present disclosure. In yet another alternative embodiment, the discrete openings 22 may be more randomly formed in the panel 14.

Still referring to FIG. 2, in the illustrated embodiment, the first and second shaped apertures 32, 34 of the panel 14 are each arranged in rows of similarity. That is, the discrete openings 22 of the panel 14 are arranged to provide rows of only the first shaped aperture 32 and rows of only the second shaped aperture 34. The rows of the first shaped apertures 32 and the rows of the second shaped apertures 34 alternate along the height H1 of the panel 14. Other row and column patterns of the first and second shaped apertures 32, 34 can also be used.

Figure 3:
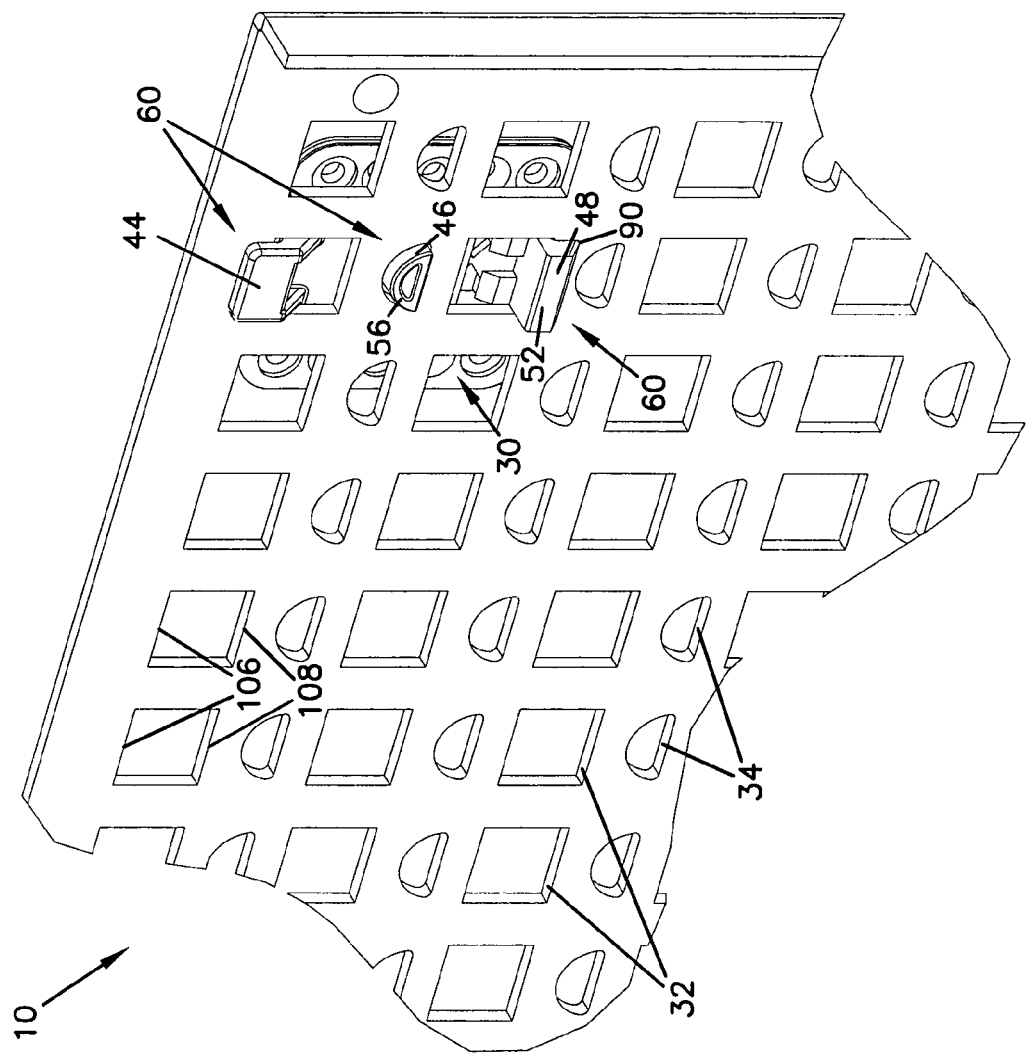
FIG. 3 is a partial, rear perspective view of the panel of the cable management assembly of FIG. 1.

Referring now to FIGS. 3-5, the back plate 30 of the cable management devices 24 includes securing structure 60 that securely attaches the device to the panel 14. The discrete openings 22 of the panel 14 are sized and shaped to receive mating elements of the securing structure 60 of the back plate 30. The securing structure 60 of the cable management devices 24 is configured to permit attachment and detachment of the device 24 from a front side 28 (FIG. 1) of the panel 14 (i.e., attachment and detachment can be performed via access to only the front side 28). This simplifies use of the present cable management assembly 10 by eliminating the need for a user to access the back side of the panel 14 for installation or removal of the device 24.

The first shaped apertures 32 of the panel 14 can be referred to as attaching apertures, while the second shaped apertures 34 can be referred to as locating apertures. As will be described in greater detail hereinafter, the attaching apertures 32 receive mating elements of the securing structure 60 of the cable management device 24 to secure the device to the panel 14, and the locating apertures 34 assist to properly orient the cable management device 24. In the illustrated embodiment, the attaching apertures 32 are square apertures, and the locating apertures 34 are half-circle apertures. Other shapes and configurations can be used in accord with the principles disclosed.

Referring now to FIGS. 3 and 5, the securing structure 60 of the back plate 30 includes a first attaching element 44, a second attaching element 46, and a third attaching element 48. The first attaching element 44 is located adjacent to a top edge 76 (FIG. 5) of the back plate 30. The second attaching element 46 is generally located in the center region of the back plate 30. The third attaching element is located adjacent to a bottom edge 86 of the back plate 30.

The first attaching element 44 of the securing structure 60 corresponds to the shape of the first shaped attaching aperture 32. The first attaching element 44 extends beyond the top edge 76 of the back plate 30. As shown in FIG. 5, the first attaching element 44 can include a hook having a generally square configuration corresponding to the square attaching apertures 32 of the panel 14.

Figure 10:
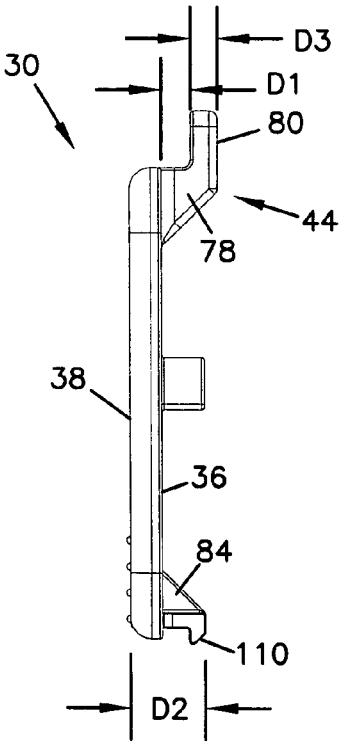
FIG. 10 is a side elevation view of the back plate of FIG. 9.

Referring to FIG. 5, the hook 44 includes a neck portion 78 attached to or formed on the rear surface 36 of the back plate 30, and an extension portion 80. As shown in FIG. 10, the neck portion 78 offsets the extension portion 80 of the hook from the rear surface 36 of the back plate 30 a distance D1. The distance D1 accommodates the thickness of the panel 14 when the back plate 30 is attached to the panel 14.

Still referring to FIG. 5, the second attaching element 46 of the securing structure 60 of the back plate 30 is a locating element that corresponds to the shape of the second shaped apertures 34. In the illustrated embodiment, the second attaching element 46 is a projection or key 56 that projects outward from the rear surface 36 of the back plate 30. The key 56 in combination with the second locating aperture 34 ensures that the cable management device 24 is properly oriented relative to the panel 14.

In particular, the key 56 is shaped such that the cable management device 24 can be mounted and attached to the panel 14 in only a particular orientation. This feature makes certain that the cable management device 24 is properly oriented for that particular device's intended use. In the illustrated embodiment, the key 56 is a half-circle projection that corresponds to the half-circle shape of the locating apertures 34. To attach the cable management device 24 to the panel 14, the orientation of the half-circle key 56 must match the orientation of the half-circle locating aperture 34.

Referring to FIGS. 3 and 4, the third attaching element 48 of the securing structure 60 of the back plate 30 includes a spring latch 50. The spring latch 50 has a movable latch 52 that engages one of the first shaped apertures 32 when the device 24 is attached to the panel 14. The movable latch 52 provides a snap fit connection that is easy-to-use and reliably secures the device 24 at a selection location.

Figure 6:
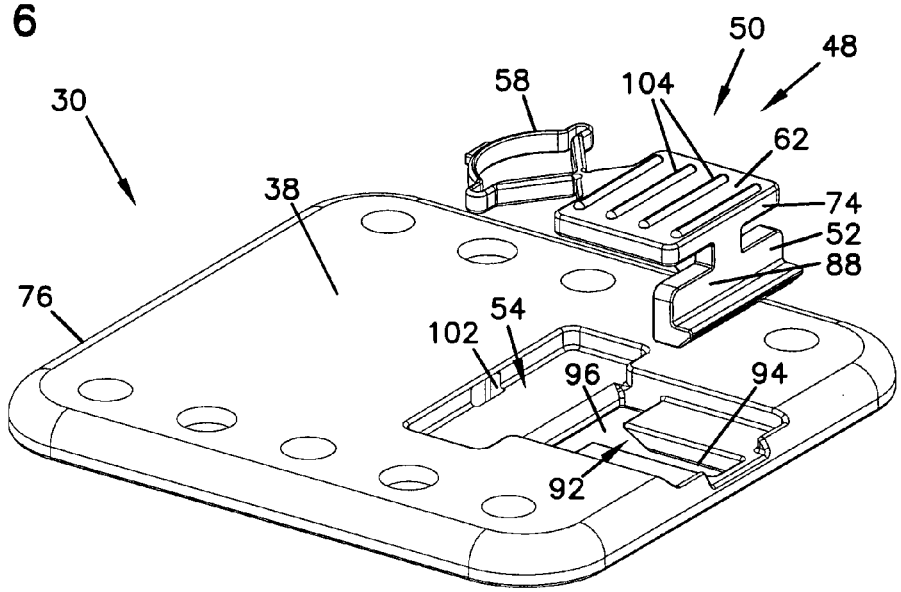
FIG. 6 is an exploded bottom view of the back plate of FIG. 4.
Figure 7:
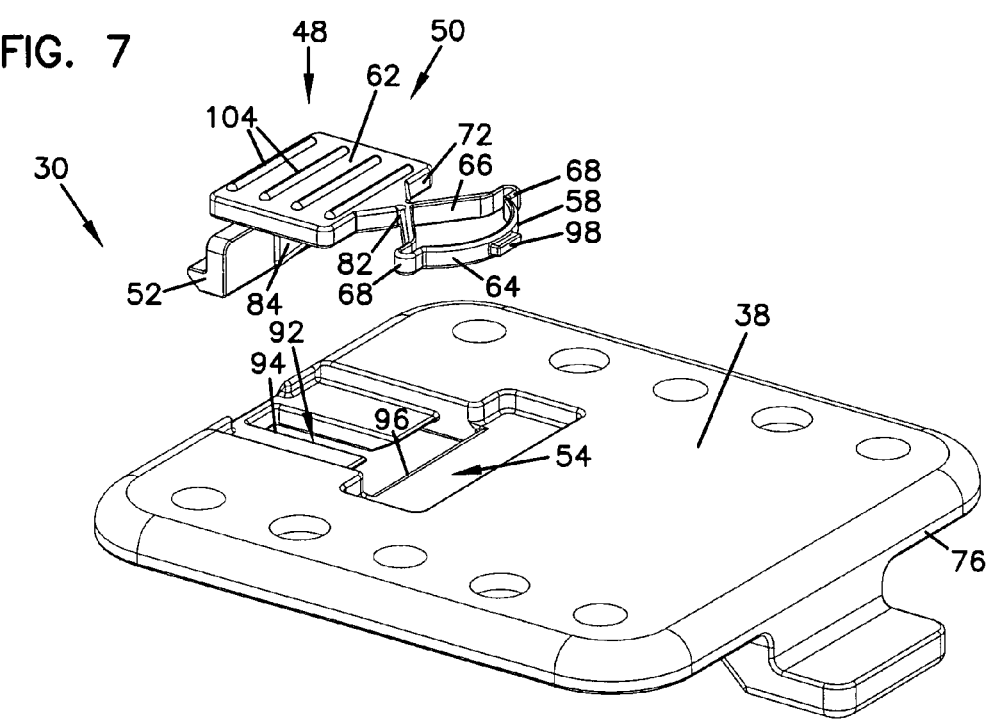
FIG. 7 is an exploded top view of the back plate of FIG. 6.

As shown in FIGS. 6 and 7, the spring latch 50 is positioned within a depression or recess 54 formed in the front surface 38 of the back plate 30. The spring latch 50 includes a spring or biasing portion 58, a grip tab 62, and the moveable latch 52. When the spring latch 50 is positioned within the recess 54 of the back plate 30, the spring 58 biases the moveable latch 52 in a direction away from the top edge 76 of the back plate 30 (e.g. in a downward direction represented by arrow A in FIG. 9). As will be described in greater detail hereinafter, the grip tab 62 includes gripping ribs 104 that aid a user in moving the moveable latch 52 in a direction toward the top edge 76 of the back plate (e.g. in an upward direction represented by arrow B in FIG. 8).

Figure 9:
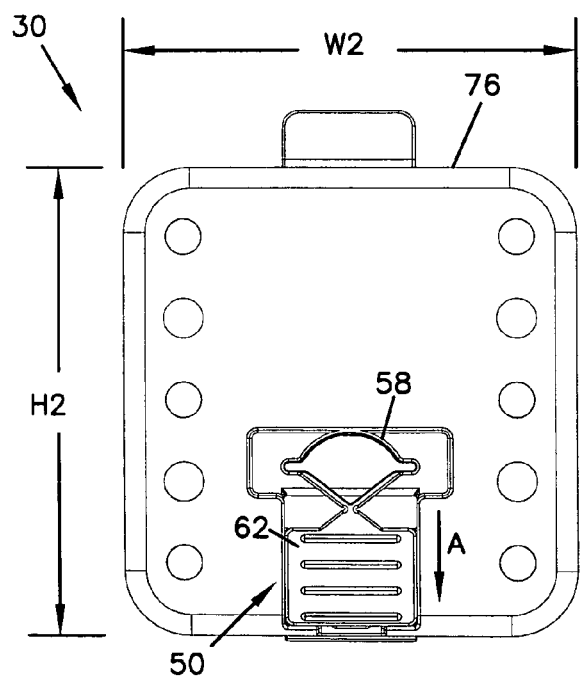
FIG. 9 is a front elevation view of the back plate of FIG. 8, shown with the spring latch of the back plate in a downward latched position.

In the illustrated embodiment, the moveable latch 52 includes a latch body 88 (FIG. 6) and a bracket piece 84 (FIG. 7; see also FIGS. 5 and 10). The spring 58 includes first and second flexible bow members 64, 66 interconnected to one another at curved flexure regions 68. The curved flexure regions 68 (see also FIG. 4) accommodate compressive movement of the bow members 64, 66, which creates a biasing force upon the moveable latch 52 in the direction A (FIG. 9).

Referring still to FIGS. 6 and 7, the grip tab 62 of the spring latch 50 includes a first end 72 and a second end 74. The spring 58 is interconnected to the grip tab 62 at the first end 72, and the latch 52 is interconnected to the grip tab 62 at the second end 74. In particular, the spring 58 is interconnected to the grip tab 62 at a union 82 formed with the second flexible bow member 66 of the spring; the moveable latch 52 is interconnected to the grip tab 62 by the bracket piece 84.

To install the spring latch 50 within the recess 54 of the back plate 30, the body 88 of the moveable latch 52 is inserted within a slot 92 formed in the back plate 30. The slot 98 is disposed within the recess 54. The slot 92 includes a longitudinal portion 94 and a transverse portion 96 that define a T-shape (see also FIG. 5). The transverse portion 96 of the T-shaped slot 92 is sized to receive the body 88 of the moveable latch 52. The longitudinal portion 94 is sized to receive only the bracket piece 84 of the latch. The body 88 is inserted through the transverse portion 96 of the slot 92 and the moveable latch 52 is then slid downward so that the bracket piece 84 is positioned within the longitudinal portion 94 of the slot 92, as shown in FIG. 5.

To complete the installation of the spring latch 50, the spring 58 is compressed, i.e., the first flexible bow member 64 is pressed toward the second flexible bow member 66, such that a securing tab 98 (FIG. 7) can be inserted into a notch 102 (FIG. 6) located within the recess 54. The securing tab 98 is located on the first flexible bow member 64 and engages the notch 102 to secure the spring latch 50 within the recess 54 of the back plate 30. When secured in this manner, the grip tab 62 and the spring 58 are located within the recess 54. In particular, the grip tab 62 and the spring 58 are generally flush with the rear surface 38 of the back plate 30. That is, no portion of the grip tab 62 or the spring 58 extends beyond the planes defined by the front and rear surfaces 38, 36, of the back plate 30, with the exception of the gripping ribs 104, as shown in FIG. 10.

When the spring latch 50 is positioned within the recess 54 of the back plate 30, the body 88 of the movable latch 52 extends or projects outward from the rear surface 36 of the back plate 30. The movable latch 52 is arranged to slide or move (e.g., slide upward and downward) within the longitudinal portion 94 of the T-shaped slot 92. In use, this arrangement provides the snap-fit connection that permits the user to easily attach and detach the device 24 to the panel 14.

Attachment and detachment of the device 24 is tool-free; that is, the back panel 30 is designed to secure to the panel 14 without the use of tools or separate fastening components. The cable management device 24 attaches to and detaches from the panel 14 from one side (e.g., the front side 28) to simplify the installation and removal of the device. While FIG. 3, for example, shows only a back plate 30, it is to be understood that the chosen device body (e.g., 26) is secured to the front surface 38 of the back plate 30 prior to attaching the back plate 30 to the panel 14.

Referring to FIG. 3, to attach a device to the panel, the first attaching element 44 of the back plate 30 is positioned within a selected one of the first shaped apertures 32. In particular, the hook 44 is placed and position to engage an upper edge 106 of one of the square attaching apertures 32, i.e., an upper first aperture 32. With the hook 44 engaged, the back plate 30 is then pivoted about the upper edge 106 of the upper first aperture 32 such that the key 56 of the back plate aligns with a second shaped aperture 34. As the device 24 continues to pivot, a lip 90 (see also FIG. 5) of the body 88 of the moveable latch 52 contacts a lower edge 108 of another of the first attaching apertures 32, i.e., a lower first aperture 32.

Figure 8:
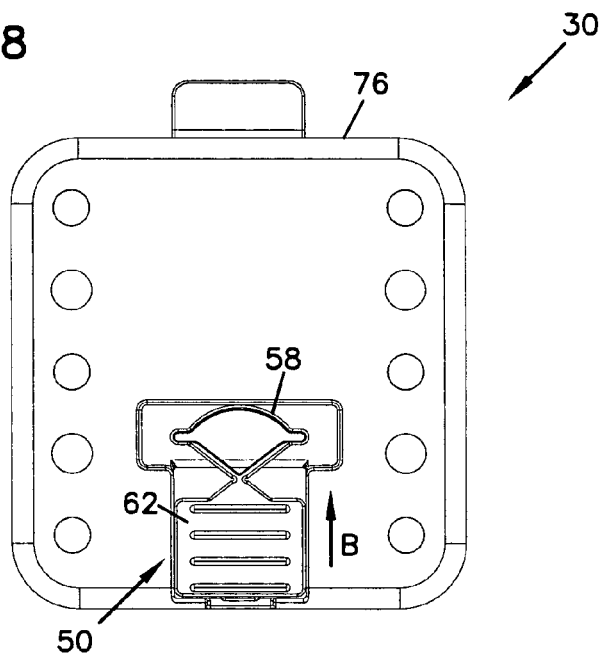
FIG. 8 is a front elevation view of the back plate of FIG. 4, shown with a spring latch of the back plate in an upward compressed position.

Referring back to FIG. 5, the lip 90 of the latch body 88 includes a ramped surface 110 (see also FIG. 10). The lower edge 108 of the lower first aperture 32 contacts the ramped surface 110 of the lip 90 causing the moveable latch 52 to slide upward in the slot 92 against the biasing force of the spring 58. This upward spring-compressed position is shown in FIG. 8. When the back plate 30 is pivoted flush with the panel, the latch 52 snaps back into a downward latched position, as shown in FIGS. 3 and 9. Referring again to FIG. 5, the bracket piece 84 and the latch body 88 of the moveable latch 52 are arranged such that the lip 90 catches the edge 108 (FIG. 3) of the first shaped aperture 32 when attached to the panel 14. When snap-fit to the panel 14, the cable management device 24 cannot be inadvertently pulled, pushed, or pivoted out of position.

Referring to FIGS. 8-10, as previously described, the grip tab 62 and the spring 58 of the spring latch 50 reside within the planes defined by the front and rear surfaces 38, 36 of the back plate 30. The grip tab 62 and the spring 58 move and flex in a direction such that the tab 62 and the spring 58 remain within or between the planes defined by the back plate 30. This arrangement maintains a low-profile feature of the present back plate 30. The low-profile feature of the back plate is described in greater detail hereinafter.

To remove the cable management device 24 from the panel, a user simply slides the grip tab 62 of the spring latch 50 upward such that the latch 52 moves upward within the longitudinal portion 94 of the slot 92. The gripping ribs 104 aid the user in moving the grip tab 62 upward against the biasing force of the spring 58. Moving the latch 52 upward disengages the lip 90 of the latch 52 from the lower edge 108 of the lower first aperture 32. The spring latch 50 can then be pivoted outward from the aperture 32. At the same time, the key 56 of the back plate 30 disengages from the second aperture 34. The hook 44 is then unhooked or disengaged from the upper first aperture 32 to detach the entire cable management device 24 from the panel 14.

The presently disclosed back plate 30 of the cable management device 24 is a low-profile back plate. In some conventional arrangements, the attachments extend from a back surface a distance that requires greater clearance space to accommodate the attachments. When mounting conventional arrangements within a cabinet, for example, accommodations must be made for the required clearance space. As can be understood, space within a cabinet is often very limited. The present low-profile back plate 30 requires less space and is more easily adaptable for use in cabinets.

In particular, referring to FIG. 9, the present back plate 30 has a width W2, a height H2, and a depth D2 (FIG. 10). The width W2 of the back plate is preferably between 1.25 and 3.0 inches; more preferably between about 1.5 and 2.0 inches. Similarly, the height H2 of the back plate is preferably between 1.25 and 3.0 inches; more preferably between about 1.5 and 2.0 inches. Other sizes of back plates can be used in accordance with the principles disclosed.

The low-profile feature of the present back plate is defined by the depth D2 of the back plate 30; and more particularly, by a dimension D3. The dimension D3 is the furthest distance from the panel 14 that the attaching elements 44, 46, 48 extend. In the illustrated embodiment, the dimension D3 is defined by the first attaching element 44, as the first attaching element 44 extends farthest from the panel 14 when the back plate 30 is attached to the panel. In alternative embodiments, one of the other of the second and third attaching elements may extend farthest from the panel. Referring to FIG. 10, the attaching elements 44, 46, 48 extend outward from the rear surface 36 of the back plate 30 a total distance no greater than the sum of the panel thickness (e.g. D1) and the dimension D3. The dimension D3 is therefore generally the clearance space required to accommodate the device 24.

The overall depth D2 of the back plate 30 is typically less than 0.260 inches; more preferably less than about 0.240 inches. As can be understood, the overall depth D2 depends upon the panel thickness, which is accommodated by the neck portion 78 of the first attaching element 77 and by the bracket piece 84 of the third attaching element 48. In the illustrated embodiment, the depth D2 of the back plate 30 is about 0.230 inches. The dimension D3 is preferably about 0.150 inches or less; more preferably about 0.100 inches or less.

The arrangement and recessed positioning of the spring latch 50, and the reduced thickness dimension D3 of the securing structure 60, permits the low-profile back plate 30 to be mounted within enclosures that have limited space. The low-profile design of the back plate 30 requires less clearance space for attaching devices to a panel and therefore provides greater versatility for use in applications previously not feasible.

FIGS. 11 and 12 illustrate another embodiment of a telecommunications system 200 including a cable management assembly 210. The cable management assembly 210 includes the same features previously described with respect to the cable management assembly 10 of FIG. 1, but is sized to fit within a smaller area. In particular, the cable management assembly 210 includes a panel 214 that is sized to fit within a cabinet 212 (schematically represented). In the illustrated embodiment, the panel 214 includes only two rows 242 of first shaped apertures 232 and only a single row 242 of second shaped apertures 234, as space is often limited inside the cabinet 212. As previously described, the low-profile back plate 30 of the devices 24 requires less clearance space and is particularly useful for managing cables within cabinets.

The presently disclosed cable management assemblies 10, 210 provide flexibility in permitting a user to position any of a number of different cable management devices at a plurality of selected locations on the panel 14, 214. In particular, the preferred panel is constructed to provide a plurality of placement coordinates (i.e. vertical and horizontal locations) from which a user may choose to position the cable management devices 24. With this design, a user is not limited to a pre-made, fixed cable management system, which may not fit a particular need. In addition, the present cable management assembly 10, 210 is easily adapted to accommodate the changing needs of a user. That is, the securing structure (e.g., 60) of the cable management devices 24 permits a user to easily attach and detach the device to and from the panel. This feature permits a user to quickly and easily modify a system's cable management strategy to accommodate growth in a quickly changing industry.

Further, the presently disclosed devices 24 include a back plate 30 that is low-profile in design. The low-profile back plate 30 requires less clearance space for attaching devices to the panel and therefore provides greater versatility for use in applications where space is limited.

The above specification provides a complete description of the cable management assembly, system, and method. Since many embodiments of the invention can be made without departing from the spirit and scope of the invention, the invention resides in the claims hereinafter appended.

What is claimed is:

1. A mounting arrangement for attaching a cable management device to a panel, the mounting arrangement comprising:
   a) a back plate having first and second edges, and a front surface and a rear surface extending between the first and second edges;
   b) a first attaching element located adjacent to the first edge of the back plate;
   c) a second attaching element projecting outward from the rear surface of the back plate; and
   d) a third attaching element that provides a snap-fit connection when the back plate is attached to the panel, the third attaching element being located adjacent to the second edge of the back plate, the third attaching element including a moveable latch, a spring that biases the moveable latch, and a grip tab that assists a user in compressing the spring;
   e) wherein the spring lies completely within front and rear planes defined by the front and rear surfaces of the back plate.

2. The mounting arrangement of claim 1, wherein the first attaching element includes a hook attachment.

3. The mounting arrangement of claim 1, wherein the second attaching element has a half-circle shape.

4. The mounting arrangement of claim 1, wherein the spring biases the moveable latch in a first direction.

5. The mounting arrangement of claim 4, wherein the spring includes first and second flexible bow members that bias the latch in the first direction.

6. The mounting arrangement of claim 4, wherein the grip tab assists a user in compressing the spring in a second direction opposite the first direction.

7. The mounting arrangement of claim 6, wherein the moveable latch of the third attaching element is located at a first end of the grip tab and the spring is located at an opposite second end of the grip tab.

8. The mounting arrangement of claim 1, wherein the grip tab and the spring are located within a recess formed in the back plate.

9. The mounting arrangement of claim 1, wherein the moveable latch includes a ramped surface that engages the panel and provides for the snap-fit connection.

10. The mounting arrangement of claim 1, wherein the third attaching element is positioned within a recess formed in the back plate.

11. The mounting arrangement of claim 10, wherein the third attaching element includes a securing tab, the securing tab being positioned within a notch formed in the back plate to secure the third attaching element within the recess of the back plate.

12. The mounting arrangement of claim 10, wherein the recess is formed in only the front surface of the back plate.

13. The mounting arrangement of claim 10, wherein the moveable latch is positioned within a slot located in the recess of the back plate, the moveable latch projecting from the rear surface of the back plate.

14. The mounting arrangement of claim 13, wherein the moveable latch slides upward and downward within the slot.

15. The mounting arrangement of claim 13, wherein the moveable latch includes a body having a lip and a bracket piece, the bracket piece and body being arranged such that the lip of the body catches an edge of a panel aperture when attached to the panel.

16. The mounting arrangement of claim 15, wherein the slot is a T-shaped slot having a longitudinal portion and a transverse portion, the transverse portion being sized to receive the body of the latch, the longitudinal portion being sized to receive only the bracket piece of the latch.

17. The mounting arrangement of claim 1, wherein the back plate includes holes sized for receipt of fasteners.

18. The mounting arrangement of claim 1, wherein each of the first, second, third attaching elements extends a total distance outward from the rear surface of the back plate, the total distance being no greater than the sum of the panel thickness and about 0.100 inches.

19. A mounting arrangement for attaching a cable management device to a panel, the mounting arrangement comprising:
   a) a back plate having a front surface and a rear surface;
   b) a first attaching element offset from the rear surface of the back plate by a panel thickness;
   c) a second attaching element that orients the back plate when mounted to the panel; and
   d) a third attaching element that provides a snap-fit connection;
   e) wherein each of the first, second, and third attaching elements extends a total distance outward from the rear surface of the back plate, the total distance being no greater than the sum of the panel thickness and about 0.100 inches.

20. The mounting arrangement of claim 19, wherein the first attaching element includes a hook attachment.

21. The mounting arrangement of claim 19, wherein the second attaching element has a half-circle shape.

22. The mounting arrangement of claim 19, wherein the third attaching element includes a spring that biases a moveable latch to provide the snap-fit connection.

23. The mounting arrangement of claim 22, wherein the third attaching element further includes a grip tab that assists a user in compressing the spring for removal of the back plate from a panel.

24. The mounting arrangement of claim 23, wherein the moveable latch of the third attaching element is located at a first end of the grip tab and the spring is located at an opposite second end of the grip tab.

25. The mounting arrangement of claim 23, wherein the grip tab and the spring are located within a recess formed in the back plate.

26. The mounting arrangement of claim 22, wherein the moveable latch includes a ramped surface that engages a panel and provides for the snap-fit connection.

27. The mounting arrangement of claim 19, wherein the third attaching element is positioned within a recess formed in the back plate.

28. The mounting arrangement of claim 27, wherein the third attaching element includes a securing tab, the securing tab being positioned within a notch formed in the back plate to secure the third attaching element within the recess of the back plate.

29. The mounting arrangement of claim 27, wherein the recess is formed in only the front surface of the back plate.

30. The mounting arrangement of claim 27, wherein the third attaching element includes a moveable latch positioned within a slot located in the recess of the back plate.

31. The mounting arrangement of claim 30, wherein the moveable latch slides upward and downward within the slot.

32. The mounting arrangement of claim 30, wherein the moveable latch includes a body having a lip and a bracket piece, the bracket piece and body being arranged such that the lip of the body catches an edge of a panel aperture when attached to the panel.

33. The mounting arrangement of claim 32, wherein the slot is a T-shaped slot having a longitudinal portion and a transverse portion, the transverse portion being sized to receive the body of the latch, the longitudinal portion being sized to receive only the bracket piece of the latch.

34. The mounting arrangement of claim 19, wherein the third attaching element includes a moveable latch, a spring that biases the moveable latch, and a grip tab that assists a user in compressing the spring, and wherein the spring lies completely within front and rear planes defined by the front and rear surfaces of the back plate.

35. A cable management device, comprising:
   a) a mounting arrangement for attaching the cable management device to a panel, the mounting arrangement including:
      i) a back plate having first and second edges, and a front surface and a rear surface extending between the first and second edges;
      ii) a first attaching element located adjacent to the first edge of the back plate;
      iii) a second attaching element projecting outward from the rear surface of the back plate; and iv) a third attaching element that provides a snap-fit connection when the back plate is attached to the panel, the third attaching element being located adjacent to the second edge of the back plate, the third attaching element including a moveable latch, a spring that biases the moveable latch, and a grip tab that assists a user in compressing the spring, wherein the spring lies completely within front and rear planes defined by the front and rear surfaces of the back plate; and b) a cable management body extending from the front surface of the back plate of the mounting arrangement, the cable management body including a radius limiting surface that prevents cable from exceeding a minimum bend radius.

36. A cable management device, comprising:

a) a mounting arrangement for attaching the cable management device to a panel, the mounting arrangement including:

i) a back plate having a front surface and a rear surface;

ii) a first attaching element offset from the rear surface of the back plate by a panel thickness;

iii) a second attaching element that orients the back plate when mounted to the panel; and iv) a third attaching element that provides a snap-fit connection;

v) wherein each of the first, second, and third attaching elements extends a total distance outward from the rear surface of the back plate, the total distance being no greater than the sum of the panel thickness and about 0.100 inches; and b) a cable management body extending from the front surface of the back plate of the mounting arrangement, the cable management body including a radius limiting surface that prevents cable from exceeding a minimum bend radius.

37. The mounting arrangement of claim 36, wherein the third attaching element includes a moveable latch, a spring that biases the moveable latch, and a grip tab that assists a user in compressing the spring, and wherein the spring lies completely within front and rear planes defined by the front and rear surfaces of the back plate.

38. A cable management system, comprising:

a) a panel defining a plurality of discrete openings, the discrete openings including first shaped apertures and second shaped apertures, the panel having a front side and a back side; and b) a cable management device having a mounting arrangement configured to secure the cable management device to the panel at a selected location, the mounting arrangement including:

i) a back plate having first and second edges, and a front surface and a rear surface extending between the first and second edges;

ii) a first attaching element located adjacent to the first edge of the back plate;

iii) a second attaching element projecting outward from the rear surface of the back plate; and iv) a third attaching element that provides a snap-fit connection when the back plate is attached to the panel, the third attaching element being located adjacent to the second edge of the back plate, the third attaching element including a moveable latch, a spring that biases the moveable latch, and a grip tab that assists a user in compressing the spring;

v) wherein the spring lies completely within front and rear planes defined by the front and rear surfaces of the back plate.

39. The system of claim 38, wherein the mounting arrangement permits selective attachment and detachment of the cable management device from the front side of the panel.

40. The system of claim 38, wherein the cable management device includes a cable management body extending from the front surface of the back plate, the cable management body including a radius limiting surface that prevents cable from exceeding a minimum bend radius.

41. The system of claim 38, further including adjacent telecommunication racks, the panel being mounted between the adjacent telecommunication racks.

42. The system of claim 38, further including a telecommunications enclosure, the panel being mounted within the telecommunications enclosure.

43. The system of claim 38 wherein the first attaching element includes a hook attachment.

44. The system of claim 38, wherein the second attaching element has a half-circle shape.

45. The system of claim 38, wherein the spring biases the moveable latch to provide the snap-fit connection.

46. The system of claim 45, wherein the moveable latch includes a body having a lip and a bracket piece, the bracket piece and body being arranged such that the lip of the body catches an edge of one of the first and second shaped apertures when attached to the panel.

47. The system of claim 38, wherein the moveable latch is positioned within a slot formed in the back plate.

48. The system of claim 47, wherein the moveable latch slides upward and downward within the slot.

49. The system of claim 38, wherein the third attaching element is located within a recess formed in the back plate.

50. The system of claim 38, wherein each of the first, second, third attaching elements extends a distance outward from the back side of the panel when the cable management device is secured to the panel at the selected location, the distance being no greater than about 0.100 inches.

51. A cable management system, comprising:

a) a panel defining a plurality of discrete openings, the discrete openings including first shaped apertures and second shaped apertures, the panel having a front side and a back side; and b) a cable management device having a mounting arrangement configured to secure the cable management device to the panel at a selected location, the mounting arrangement including:

i) a back plate having a front surface and a rear surface;

ii) a first attaching element offset from the rear surface of the back plate by a panel thickness;

iii) a second attaching element that orients the back plate when mounted to the panel; and iv) a third attaching element that provides a snap-fit connection;

v) wherein each of the first, second, and third attaching elements extends a distance outward from the back side of the panel when the cable management device is secured to the panel at the selected location, the distance being no greater than about 0.100 inches.

52. The mounting arrangement of claim 51, wherein the third attaching element includes a moveable latch, a spring that biases the moveable latch, and a grip tab that assists a user in compressing the spring, and wherein the spring lies completely within front and rear planes defined by the front and rear surfaces of the back plate.

53. A mounting arrangement for attaching a cable management device to a panel, the mounting arrangement comprising:

a) a back plate having first and second edges, and a front surface and a rear surface extending between the first and second edges, the back plate having a recess in which a T-shaped slot is defined;

b) a first attaching element located adjacent to the first edge of the back plate;

c) a second attaching element projecting outward from the rear surface of the back plate; and d) a third attaching element installed within the recess located adjacent to the second edge of the back plate, the third attaching element including a moveable latch having a body and a bracket piece, wherein a transverse portion of the T-shaped slot is sized to receive the body of the moveable latch during installation, and wherein a longitudinal portion of the T-shaped slot receives only the bracket piece of the moveable latch, the moveable latch providing a snap-fit connection when the back plate is attached to the panel.

* * * * *